United States Patent
Moretti et al.

[11] Patent Number: 5,191,284
[45] Date of Patent: Mar. 2, 1993

[54] DEVICE FOR DETECTING THE RELATIVE ROTATIONAL SPEED OF TWO ELEMENTS IN A VEHICLE WHEEL

[75] Inventors: Roberto Moretti, Cambiano; Angelo Varvello, Turin, both of Italy

[73] Assignee: SKF Indsutrie S.p.A., Turin, Italy

[21] Appl. No.: 723,746

[22] Filed: Jul. 1, 1991

[30] Foreign Application Priority Data

Apr. 7, 1990 [IT] Italy .................. 67490 A/90

[51] Int. Cl.[5] .................. G01P 3/487; G01R 33/06
[52] U.S. Cl. .................. 324/174; 324/207.2; 324/207.22; 324/207.21; 384/448; 188/181 A
[58] Field of Search .................. 324/207.22, 207.20, 324/207.21, 207.25, 174, 175; 338/32 R, 32 H; 307/309; 188/181 A; 384/448

[56] References Cited

U.S. PATENT DOCUMENTS

| | | | |
|---|---|---|---|
| 4,110,676 | 8/1978 | Edick et al. | 324/174 X |
| 4,119,911 | 10/1978 | Johnson, Jr. | 324/207.21 |
| 4,525,670 | 6/1985 | Miyagawa et al. | 324/174 X |
| 4,570,118 | 2/1986 | Tomczak et al. | 324/207.2 |
| 5,051,693 | 9/1991 | Brauer | 324/174 X |

FOREIGN PATENT DOCUMENTS

| | | | |
|---|---|---|---|
| 54-104869 | 8/1979 | Japan | 324/207.22 |
| 893986 | 4/1962 | United Kingdom | 324/174 |

Primary Examiner—Gerard R. Strecker
Assistant Examiner—Warren S. Edmonds
Attorney, Agent, or Firm—Eugene E. Renz, Jr.

[57] ABSTRACT

Device capable of detecting the rotational speed of two elements in relative such as the support elements of a vehicle wheel, in particular the rings of the roller bearing for the support the vehicle wheel, characterized in that an initial deflector or ring integral with the rotating ring of the bearing carries twin magnetized rings with pairs of poles of opposite sign, between which a magnetic sensor carried by a second deflector or support integral with the fixed ring of the bearing being is operatively inserted, the magnetic sensor being located between the n polar expansions, the number of which conforms to the pairs of opposing poles of twin magnetized rings.

9 Claims, 4 Drawing Sheets

DEVICE FOR DETECTING THE RELATIVE ROTATIONAL SPEED OF TWO ELEMENTS IN A VEHICLE WHEEL

FIELD OF THE INVENTION

The present invention relates to devices for detecting the rotational speeds of two relatively rotatable elements such as the mounting elements of a vehicle wheel.

BACKGROUND OF THE INVENTION

The need for installation of special control circuits in automotive vehicles is increasing. Typical of the type of control circuits presently in automotive vehicles include so-called anti-lock braking system (ABS) which prevent the locking of the vehicle wheels during braking, ASR Systems, which ensure correct traction of motor vehicles, devices for detecting speeds such as tachometers and devices for measuring the distance travelled such as odometers. At present these detection systems are comprised of basic component such as phonic rings, detecting sensors, on-board computers and hydraulic systems. The phonic ring is usually a serrated ring mounted on the rotating part desired to be monitored and the sensor comprising a passive or active type is mounted on the fixed part of the frame and confronts the serrated zone of the phonic ring at a predetermined distance. Electronic signals emanating from individual sensors are transmitted to the on board computer which in the case of the ABS computes the differences in the speed of wheels of the vehicle.

Passive sensors currently utilized operate by variation in reluctance and require no input. However, sensors of this type must be mounted externally to the bearing and are thus unprotected against possible impacts, contaminating agents and other hazards. This type of sensor is particularly sensitive to metal particles resulting from wear of the brakes near the sensor themselves and to the elevated temperatures developed by disc brakes. They also require appropriate calibration during the mounting phase by the user. It has also been found that the sensors are incapable of detecting rotational speeds down to zero miles per hour and thus cannot be use for tachometric and odometric measurements.

SUMMARY OF THE INVENTION

With the foregoing in mind, it is an object of the present invention to provide a detection device characterized by novel features of construction and arrangement which eliminates the shortcomings of the devices presently in use discussed above. Specifically, the invention relates to a detection device capable of detecting the relative rotational speeds of the support elements of a vehicle wheel which consist of an initial deflector or ring formed intregally with a rotating ring in the bearing and which carries twin magnetized rings with pairs of poles of opposite signs, between which a sensor of the magnetic type carried by a second deflector or support integral with the fixed ring of the bearing is operationally inserted. The magnetic sensor is located between the n polar expansions, the number of which conforms to the pairs of opposing poles of the twin magnetized rings.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENTS

Figure 1:
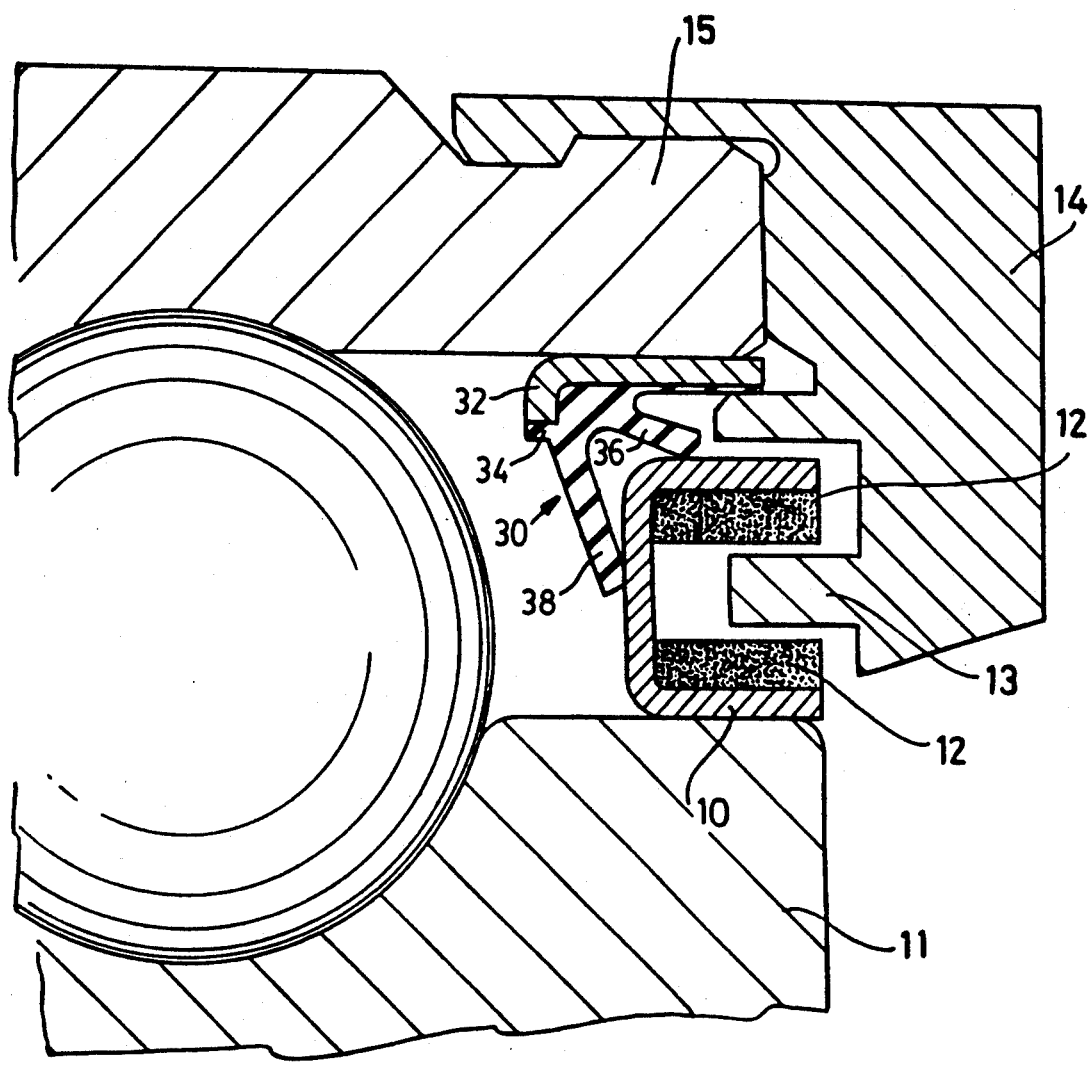
FIG. 1 is a fragmentary sectional view of a wheel bearing incorporating a detection device constructed in accordance with the present invention.

Referring now to the drawings, and particularly to FIG. 1 thereof, there is shown an enlarged cross section of a ball bearing for supporting the wheel of a motor vehicle. The bearing includes a rotating inner ring 11, an outer fixed ring 15 and a plurality of rolling elements, in the present instance, balls in the annular space between the rings.

In accordance with the present invention, a primary support 10 of general U-shaped cross section is mounted on the inner ring 11 of the bearing and supports twin magnetized rings 12 having poles opposing each other in pairs. A magnetic sensor 13 carried by a second support 14 mounted on the fixed ring 15 of the bearing engages between the rows of magnetized rings 12 in the manner shown in FIG. 1. The magnetic sensor 13 may be of the so-called Hall-effect type or of the magneto resistance type. The magnetic Hall-effect sensor is characterized by integrated control electronics supplied by the on-board voltage of the motor vehicle. The signal sent to the on-board computer is a function n of the changes in magnetic field to which the element is subjected during one revolution of the bearing. The Hall-effect sensor can be of the linear, unipolar, bipolar or bipolar with memory type.

As best illustrated in FIG. 1, the annular space between the inner and outer rings is sealed from the outside environment by means of a seal assembly generally designated by the numeral 30 including an annular support ring 32 press fitted in the inner peripheral land surface of the outer ring 15 and a flexible sealing element 34 carried by the support ring having a pair of circumferentially extending bifurcated sealing lips 36 and 38 which engage the leg and base of the primary support 10 in the manner illustrated in FIG. 1.

Figure 2:
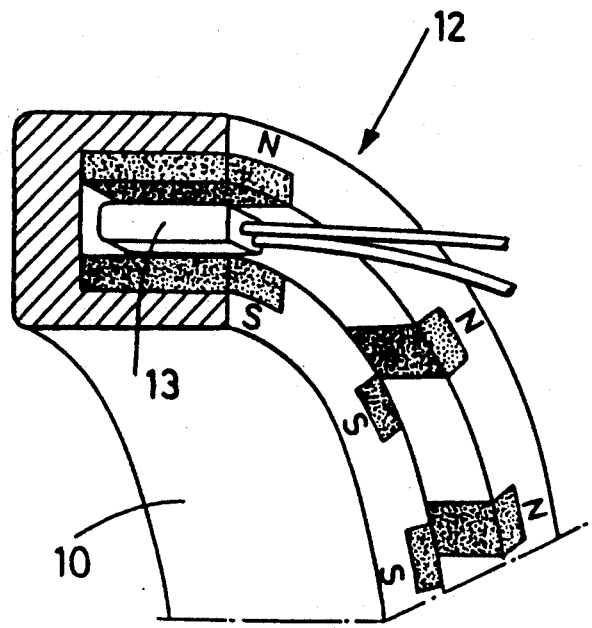
FIGS. 2-5 are partial perspective views of the detection device of the present invention showing various possible applications.
Figure 3:
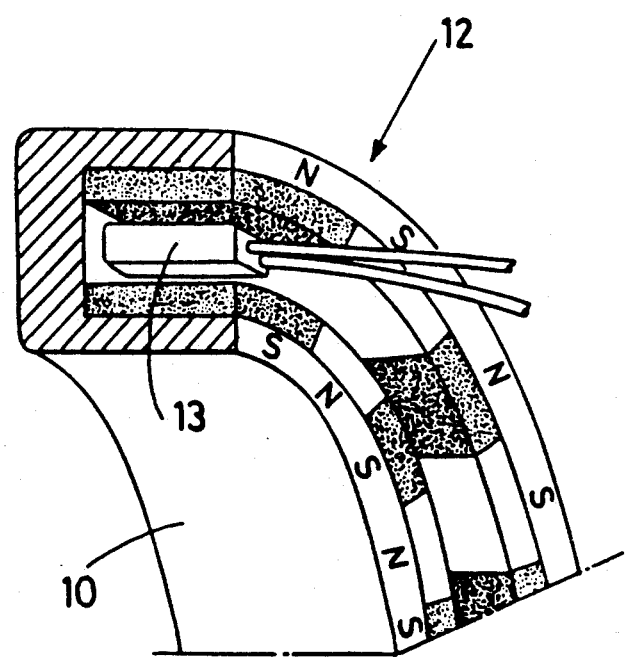

Magnetic sensor 13, as illustrated in FIG. 2 is located in the magnetic field created by the polar expansions of the n pairs of poles of opposite sign, separated by nonmagnetized spaces, or by pairs of opposite sign arranged alternately, as illustrated in the variant of FIG. 3.

As illustrated in FIG. 2, the poles of each ring have the same sign, but it is also possible for them to have alternate signs, i.e., NSN on one ring and SNS, respectively, on the other, around the entire circumference of twin rings 21.

Twin magnetized ring 12 can be made of rubber impregnated with magnetic particles and fixed or vulcanized to a support ring which can also constitute the closure element of the magnetic flux. Alternatively, twin rings 12 can be of plastic impregnated with magnetic particles or can consist of magnetic sintered material or even of elementary magnets.

The material in which this is effected can have either isotropic or anisotropic characteristics.

Figure 6:
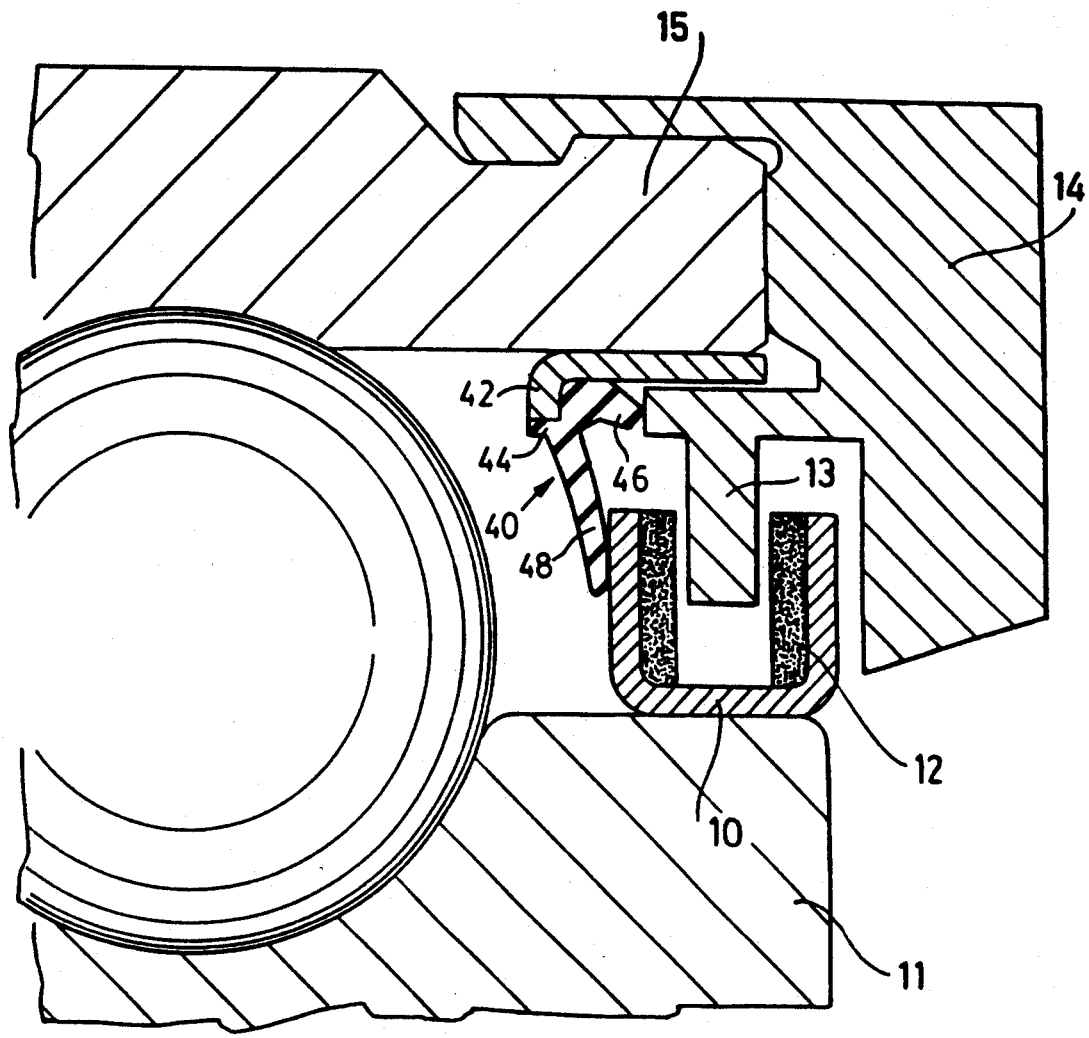
FIG. 6 is an enlarged fragmentary sectional view similar to FIG. 1 showing a modified form of detecting device in accordance with the present invention.

Twin rings 12 can present either a radial magnetic field relative to the axis of the bearing, i.e., configured as shown in FIG. 1, or an axial field, as configured in FIG. 6, without causing any change in the advantages of the inventions.

The rotation of twin magnetized rings 12 allows magnetic Hall-effect sensor 13 to detect variations in the intensity of the magnetic field in the case of FIG. 2 or variations and inversions in the magnetic field in the case of FIG. 3. A signal with a frequency proportional to the velocity is sent to the on-board computer, assuming the appropriate design of the electronics integrated into Hall-effect sensor 13.

Figure 4:
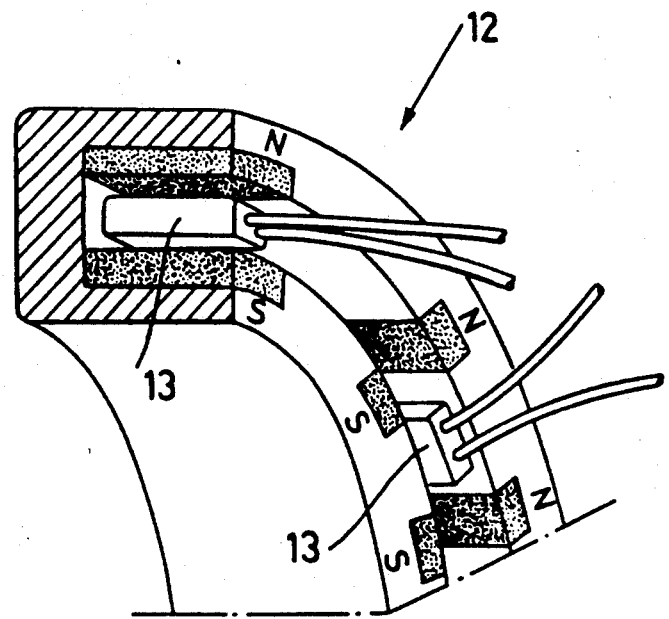
Figure 5:
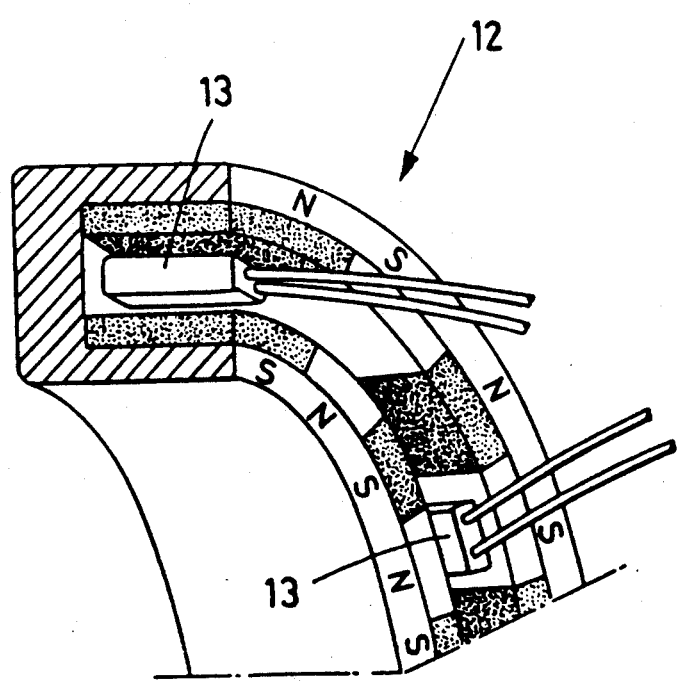

The sensor system can also consist of two or more magnetic sensors 13 with their integrated electronics to facilitate detection of the rotation, using fewer magnetic poles but with each sensor operating at the same frequency. For this application, the sensors should be shifted by an appropriate angle or in accordance with two opposite pairs of poles as illustrated schematically in FIGS. 4 and 5, corresponding to the embodiments of FIGS. 2 and 3, respectively.

The rolling elements of the bearing shown in the embodiment in fig. 6 are likewise sealed against ingress of dirt and foreign matter into the annular space between the rings by means of a seal assembly generally designated by the numeral 40. This seal assembly includes a ring like support member 42 press fitted in the inner peripheral land surface of the outer ring 15 and a resilient sealing element 44 having a short sealing lip 46 which engages the axial end face of the sensor 13 and an elongated sealing lip 48 which sealingly engages an upstanding leg of the support 10 in the manner shown in FIG. 6.

The same multisensor system can also be used to detect the direction of rotation of the wheel by providing an additional output.

What is claimed is:

1. Device for use in a braking system capable of detecting the rotational speed of two relatively rotatable rings of a roller bearing having inner and outer relatively rotatable bearings rings supporting a vehicle wheel, comprising a deflector mounted on one bearing ring having twin magnetized rings with pairs of poles of opposite sign on respective rings confronting each other, magnetic sensors carried by a second deflector mounted on the other bearing ring operatively disposed between the twin magnetized rings, said magnetic sensors being located between confronting poles, the number of which conforms to the pairs of opposite sign poles of said twin magnetized rings, said magnetic sensors being separated by multiples or fractions of half the pitch between paris of adjacent poles such that only one sensor at a time is radially aligned with confronting poles of the magnetized rings to produce signals having a frequency proportional to the relative speed of the inner and outer rings.

2. Device according to claim 1, characterized in that the configuration of the deflectors and the sensor is such that the elements which detect the relative speed are integrated with the deflectors and protected against the exterior.

3. Device according to claim 1, characterized in that the magnetic sensor is of the Hall-effect type.

4. Device according to claim 1, characterized in that the sensor is of the magnetoresistance type.

5. Device according to claim 1, characterized in that the pairs of poles of opposite sign on the twin magnetized rings are arranged alternately.

6. Device according to claim 1, characterized in that the twin magnetized rings and the sensor inserted between them have an essentially axial longitudinal extension.

7. Device according to claim 1, characterized in that the twin magnetized rings and the sensor inserted between them have an essentially radial longitudinal extension.

8. Device according to claim 1 wherein the poles of the magnetized rings are circumferentially spaced and are supported by non-magnetized spaces.

9. Device according to claim 1, characterized in that said magnetic sensors are located between pairs of opposing poles.

* * * * *